(12) United States Patent
Gerber et al.

(10) Patent No.: US 10,293,650 B2
(45) Date of Patent: May 21, 2019

(54) AXLE ARRANGEMENT FOR A VEHICLE

(71) Applicant: Bayerische Motoren Werke Aktiengesellschaft, Munich (DE)

(72) Inventors: Sven Gerber, Munich (DE); Kai-Uwe Stoerk, Wessling (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 166 days.

(21) Appl. No.: 15/182,687

(22) Filed: Jun. 15, 2016

(65) Prior Publication Data

US 2016/0288603 A1 Oct. 6, 2016

Related U.S. Application Data

(63) Continuation of application No. PCT/EP2014/074534, filed on Nov. 13, 2014.

(30) Foreign Application Priority Data

Dec. 16, 2013 (DE) .......................... 10 2013 226 123

(51) Int. Cl.
*B60G 5/04* (2006.01)
*B60G 11/08* (2006.01)
(Continued)

(52) U.S. Cl.
CPC .............. *B60G 5/043* (2013.01); *B60B 35/12* (2013.01); *B60G 5/053* (2013.01); *B60G 11/08* (2013.01);
(Continued)

(58) Field of Classification Search
CPC .... B60G 21/005; B60G 21/05; B60G 21/026; B60G 21/073; B60G 5/043; B60G 11/08; B60G 2300/50; B60K 2001/001
See application file for complete search history.

(56) References Cited

U.S. PATENT DOCUMENTS

| 613,370 A | * | 11/1898 | Histand | .................. | B60G 11/08 |
| | | | | | 267/38 |
| 1,986,832 A | * | 1/1935 | Lewis | .................... | B60G 5/005 |
| | | | | | 280/124.124 |

(Continued)

FOREIGN PATENT DOCUMENTS

| CN | 102245461 A | 11/2011 |
| CN | 102596601 A | 7/2012 |

(Continued)

OTHER PUBLICATIONS

Chinese Office Action issued in counterpart Chinese Application No. 201480064531.5 dated May 25, 2017 with English-language translation (ten (10) pages).

(Continued)

*Primary Examiner* — Frank B Vanaman
(74) *Attorney, Agent, or Firm* — Crowell & Moring LLP

(57) ABSTRACT

An axle arrangement for a motor vehicle includes two opposite wheel carriers which are connectable to a bodywork of the motor vehicle via links, and a transverse leaf spring which is connected to the two wheel carriers. The transverse leaf spring is manufactured as one piece from fiber-reinforced plastic, has at least two bands spaced apart from one another and is at least partially integrated in a shear field. The shear field extends between the two wheel carriers and on both sides is connected fixedly to the body or the bodywork of the vehicle and projects beyond the transverse leaf spring, as viewed in the longitudinal direction of the vehicle.

6 Claims, 8 Drawing Sheets

(51) Int. Cl.
  *B60G 21/05* (2006.01)
  *F16F 1/368* (2006.01)
  *B60B 35/12* (2006.01)
  *B60G 5/053* (2006.01)

(52) U.S. Cl.
  CPC .............. *B60G 21/05* (2013.01); *F16F 1/368* (2013.01); *B60G 2202/114* (2013.01); *B60G 2204/121* (2013.01); *B60G 2206/014* (2013.01); *B60G 2206/13* (2013.01); *B60G 2206/428* (2013.01); *B60G 2206/605* (2013.01); *B60G 2206/7101* (2013.01); *B60G 2300/50* (2013.01)

(56) References Cited

U.S. PATENT DOCUMENTS

| | | | | |
|---|---|---|---|---|
| 2,458,548 | A * | 1/1949 | Aronson | B60G 11/08 267/42 |
| 5,443,130 | A * | 8/1995 | Tanaka | B60K 1/00 180/65.6 |
| 2003/0030241 | A1 | 2/2003 | Lawson | |
| 2003/0122338 | A1 | 7/2003 | Carlstedt et al. | |
| 2004/0004336 | A1* | 1/2004 | Zandbergen | B60G 11/08 280/124.1 |
| 2011/0259657 | A1* | 10/2011 | Fuechtner | B60K 6/52 180/65.21 |
| 2012/0181806 | A1 | 7/2012 | Worup et al. | |
| 2012/0313339 | A1 | 12/2012 | Heimann et al. | |
| 2014/0209397 | A1 | 7/2014 | Wolf | |

FOREIGN PATENT DOCUMENTS

| | | |
|---|---|---|
| CN | 102815177 A | 12/2012 |
| DE | 690 02 316 T2 | 1/1994 |
| DE | 102 37 658 A1 | 4/2003 |
| DE | 10 2010 042 222 A1 | 4/2012 |
| DE | 10 2011 077 336 A1 | 12/2012 |
| DE | 10 2011 082 391 A1 | 3/2013 |
| EP | 0 436 407 A1 | 7/1991 |
| EP | 0 941 912 A1 | 9/1999 |
| EP | 0 941 912 B1 | 5/2002 |
| EP | 2 477 825 | 7/2012 |
| WO | WO 96/27507 A1 | 9/1996 |

OTHER PUBLICATIONS

International Search Report (PCT/IS/210) issued in PCT Application No. PCT/EP2014/074634 dated Feb. 23, 2015 with English translation (seven pages).

German-language Written Opinion (PCT/ISA/237) issued in PCT Application No. PCT/EP2014/074634 dated Feb. 23, 2015 (five pages).

German Search Report issued in counterpart German Application No. 10 2013 226 123.3 dated Oct. 14, 2014 with partial English translation (13 pages).

* cited by examiner

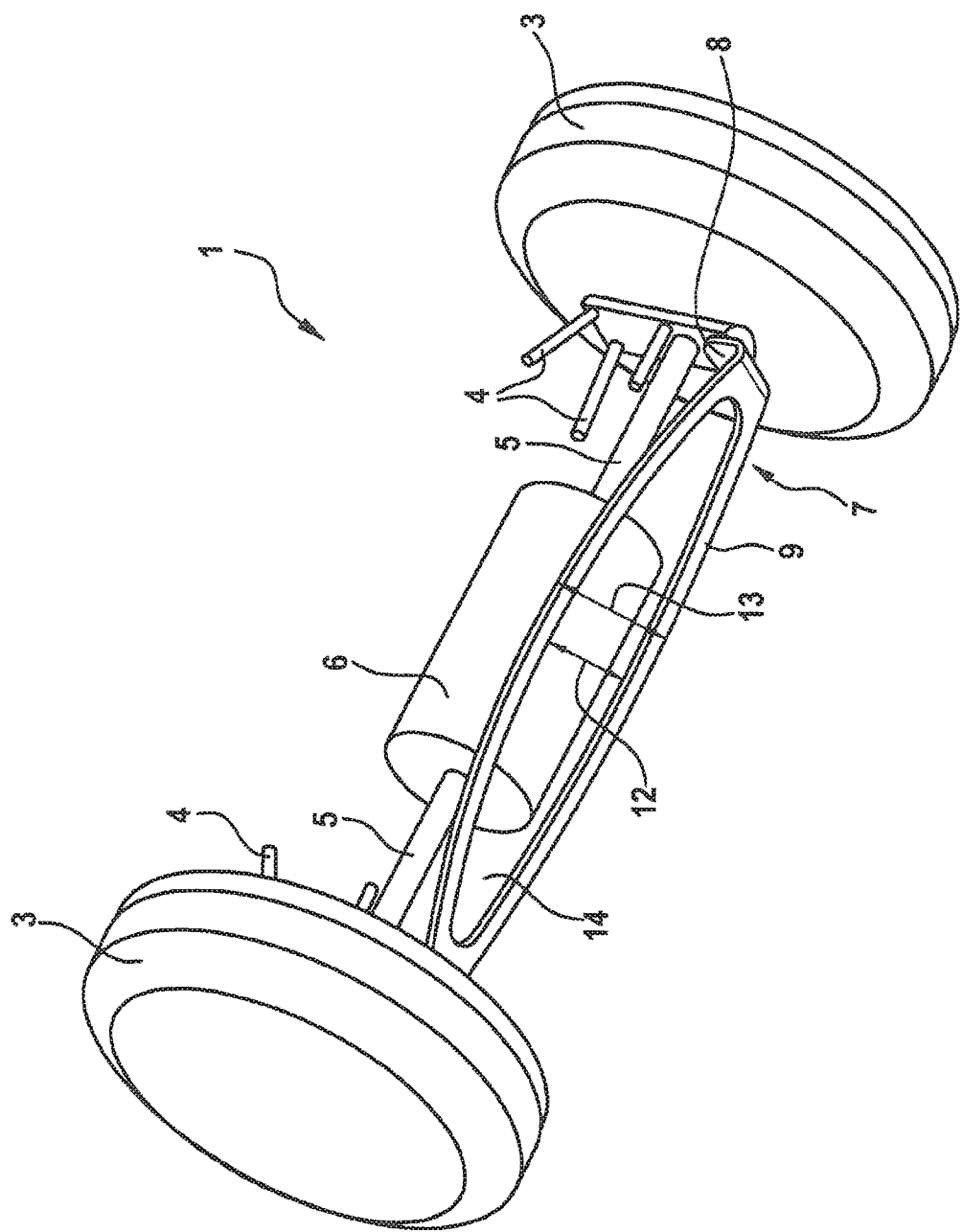

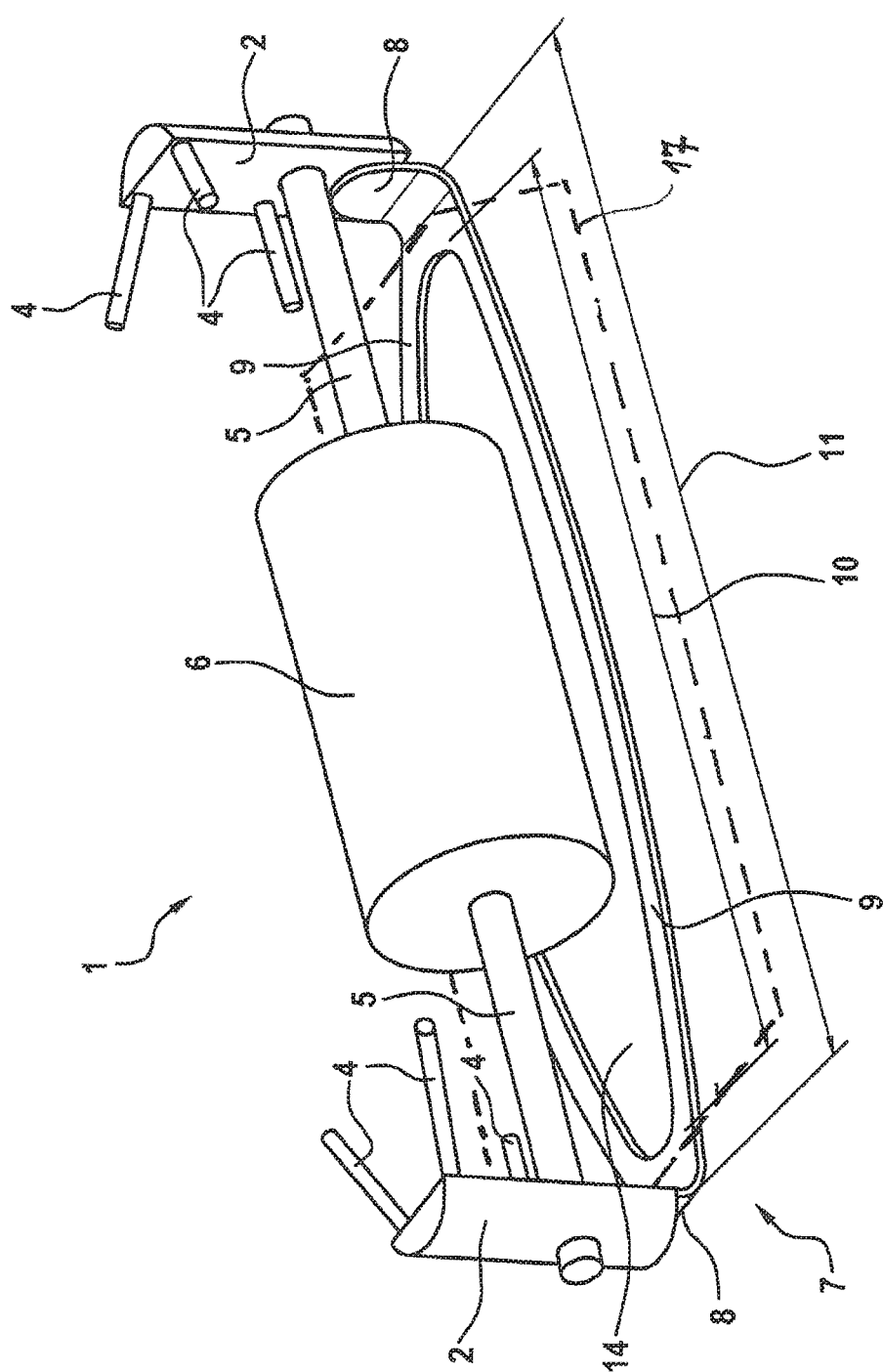

AXLE ARRANGEMENT FOR A VEHICLE

CROSS REFERENCE TO RELATED APPLICATIONS

This application is a continuation of PCI International Application No. PCT/EP2014/074534, filed Nov. 13, 2014, which claims priority under 35 U.S.C. § 119 from German Patent Application No. 10 2013 226 123.3, filed Dec. 16, 2013, the entire disclosures of which are herein expressly incorporated by reference.

BACKGROUND AND SUMMARY OF THE INVENTION

The present invention relates to a motor vehicle with an axle arrangement including two opposite wheel carriers that are connectable to a bodywork of the motor vehicle via links, and a transverse leaf spring connected to the two wheel carriers. The axle arrangement can be used as a front axle or a rear axle in a motor vehicle with four wheels. In addition to US 2003/0122338 A1 or DE 10 2010 042 222 A1, reference is made to EP 0 941 912 B1 as an example of prior art.

In general, axle arrangements with transverse leaf springs are known in the prior art. Such a transverse leaf spring extends in the transverse direction of the vehicle between two wheel carriers. If such a transverse leaf spring is made out of fiber reinforced plastic, in particular carbon fiber reinforced plastic or glass fiber reinforced plastic, a transverse leaf spring is obtained that is stable as well as lightweight. It is furthermore known that such plastic transverse leaf springs must be developed in a forked fashion, e.g. they must be designed so that they have, in the center area between the two wheel carriers, at least two so-called bands that are joined in the end area of the transverse leaf spring or at the latest in the sections thereof that connect to the wheel carriers.

Further prior art in the field of vehicle axle arrangements are the so-called shear fields (see, for example, the initially aforementioned EP 0 941 912 B1), which are transmitted to provide the bodywork structure and/or the body of the vehicle with increased stiffness and/or stability in the axle area (and therefore at the place where forces between the vehicle body and the road on which the vehicle moves are transmitted, as well as, if applicable, forces resulting from the collision of the vehicle with an obstacle). To that end, the shear fields, which generally extend in the transverse direction of the vehicle between the two peripheral areas of the vehicle body and which, when viewed in the longitudinal direction of the vehicle, also have an extension that covers the actual axle arrangement, are suitably fixedly (rigidly) connected to the body of the vehicle, preferably with carriers thereof.

It is an object of the present invention to provide a simplified design for an optimally stiff body or bodywork structure for an axle arrangement having two opposite wheel carriers that are connectable to a bodywork of a motor vehicle via links and a transverse leaf spring connected to the two wheel carriers, wherein the transverse leaf spring is made in one piece of fiber reinforced plastic and has at least two bands spaced apart from each other.

This and other objects of the invention are attained in that the transverse leaf spring is at least partially integrated in a shear field that extends between the two wheel carriers and is fixedly connected to the body or the bodywork of the vehicle at both sides. When viewed in the longitudinal direction of the vehicle, the shear field projects beyond the transverse leaf spring.

The invention therefore relates to an axle arrangement for a vehicle with two opposite wheel carriers that are connected to a bodywork and/or the vehicle body via links. The term "bodywork" or "body" is to be construed broadly here and also includes, for example, individual assemblies such as rear axle carriers, longitudinal chassis beams or cross-members of the vehicle. Furthermore, an axle arrangement according to the invention includes a transverse leaf spring that is connected to both wheel carriers. The transverse leaf spring extends approximately in the transverse direction of the vehicle and is developed in one piece. The transverse leaf spring has two bands (flanges) that are spaced apart. It is provided that the bands run together towards the ends of the transverse leaf spring, e.g. to the connecting points with the wheel carriers. By using the transverse leaf spring with two spaced apart bands, a free space is created between the two bands.

Furthermore, a shear field extends practically between the two wheel carriers. The shear field is connected to the body of the vehicle at both sides. In particular, the shear field extends in the horizontal plane. According to the invention, the aforementioned transverse leaf spring that connects the two wheel carriers is at least partially integrated in the shear field. This means that with appropriate development of the material and/or the geometry of the shear field, a component of the shear field acts as the transverse leaf spring.

Preferably, it is provided that the shear field and the transverse leaf spring are made of fiber reinforced plastic. In particular, glass fiber reinforced plastic or carbon fiber reinforced plastic is used. The transverse leaf spring can be developed at least partially as a material thickness in the shear field. This means that the transverse leaf spring is raised from the remaining component of the shear field, in particular in a vertical direction. The transverse leaf spring has at least two bands that are spaced apart from one another. Because of the plurality of bands running in the transverse direction of the vehicle, the transverse leaf spring can be distributed through multiple material thicknesses on the shear field. The shear field does not have to be designed in one piece together with the transverse leaf spring, but these two elements should constitute a connected component to facilitate assembly as well. To that end, the transverse leaf spring can be suitably laminated onto the shear field, which does not necessarily have to be developed in plastic. The transverse leaf spring can be laminated onto the upper side and/or the lower side of the shear field. Developing the transverse leaf spring in fiber reinforced plastic, in particular in carbon fiber reinforced or glass fiber reinforced plastic, facilitates a stable as well as a lightweight transverse leaf spring.

To then address the aforementioned free space between the so-called bands of the "forked" transverse leaf spring, the free space can be used by other vehicle components, for example the vehicle's power train. The transverse leaf spring is situated in particular in a horizontal plane. Accordingly, a free space developed between two bands of the transverse leaf spring also extends in a horizontal plane. So as to be able to use the free space for additional vehicle components, the free space can have a suitable size. If the free space has a first width in the transverse direction of the vehicle and the entire transverse leaf spring has a second width in the transverse direction of the vehicle, it is furthermore proposed that the first width is at least 60%, preferably at least 70% of the second width. If the free space has a first length in the longitudinal direction of the vehicle and the entire transverse leaf spring has at its longest point a second length in longitudinal direction of the vehicle, then in view of a sufficiently large free space, the first length can have at least 40%, preferably at least 50%, of the second length.

Preferably, an electrical machine extends at least partially between the two bands of the transverse leaf spring. When viewing the axle arrangement in a section perpendicular to the horizontal, at least part of the aforementioned electrical machine is situated between two and/or the two bands of the transverse leaf spring. The electrical machine is, in particular, an electric motor to drive the vehicle. Preferably, the electrical machine can also be operated with a generator. In the arrangement of the electrical machine, it is preferably provided that the armature shaft of the electrical machine is approximately aligned with the hubs of the vehicle's wheels. Accordingly, an armature shaft of the electrical machine is designed for torque transmission to at least one of the wheels. In particular, it may be provided that the electrical machine is arranged between the two wheel carriers, and on both sides of the electrical machine, one armature shaft each leads to the wheel carriers and therefore to the wheels.

A transverse leaf spring according to the invention can be connected to the wheel carriers in a wheel-guided as well as in a non-wheel-guided fashion. For the wheel-guided arrangement, it is provided that the ends of the transverse leaf spring are fixedly connected to the respective wheel carrier. In particular, three additional links are then provided to connect the individual wheel carrier to the bodywork. With a non-wheel-guided arrangement of the transverse leaf spring, the ends of the transverse leaf spring are preferably connected to the wheel carriers via connecting elements that act as pendulum supports. For example, five links are then provided to connect the wheel carrier to the bodywork. Due to the fact that the transverse leaf spring extends laterally over the shear field with extensions, such extensions of the transverse leaf spring can form the connection of the transverse leaf spring to the wheel carriers. For this purpose, the extensions are either connected to the wheel carriers fixedly or, in the case of the non-wheel guided arrangement, connected to the wheel carriers via connecting elements that act like pendulum supports.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 7 illustrates the motor vehicle axle arrangement of FIG. 6 in a different special representation; and FIG. 8 illustrates a detailed representation of FIG. 6.

In all figures, identical and/or functionally identical components are denoted with the same reference symbols.

DETAILED DESCRIPTION OF THE DRAWINGS

Figure 1:
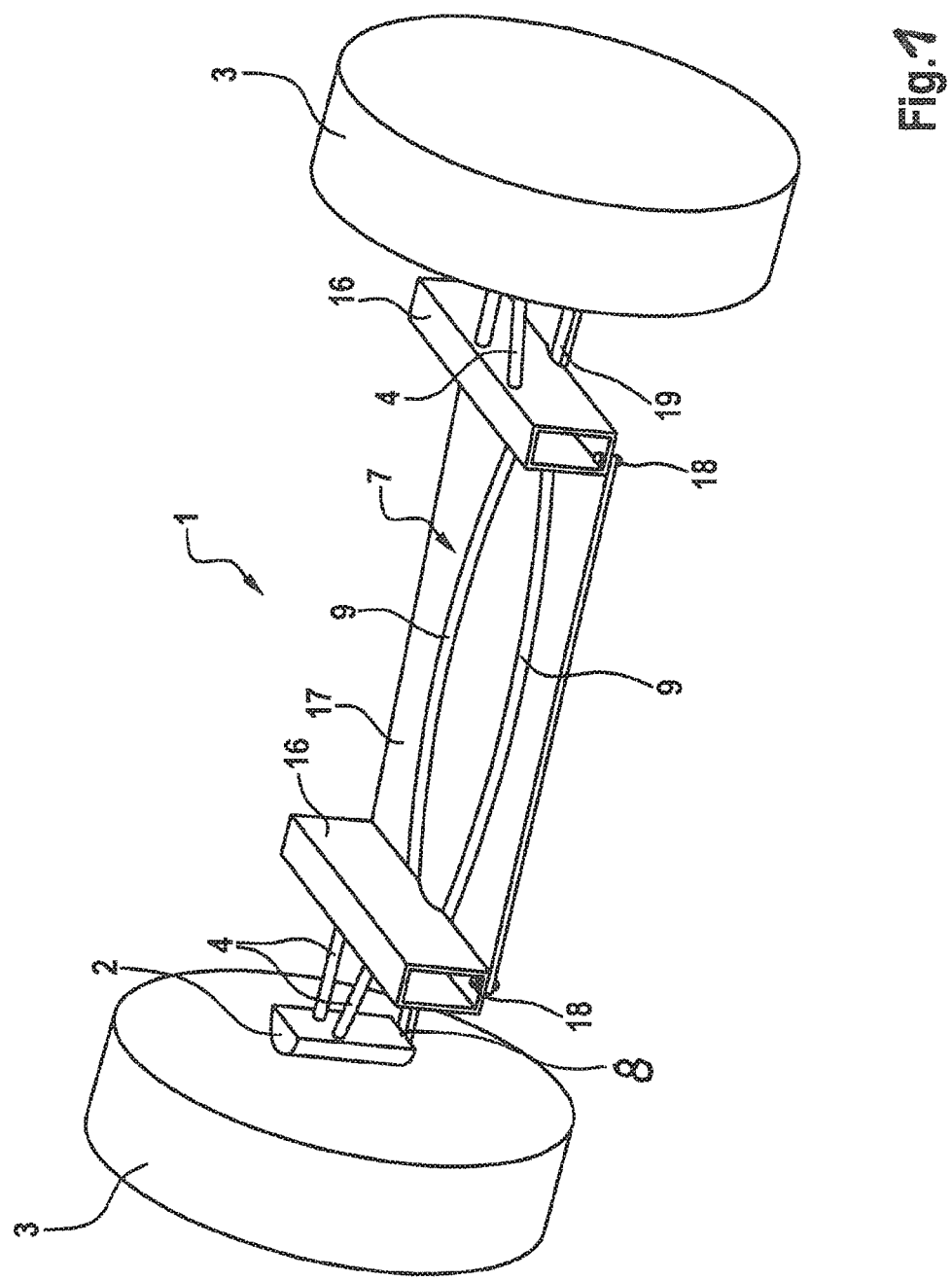
FIG. 1 illustrates an axle arrangement according to the invention for a vehicle according to a first exemplary embodiment in a first spatial representation.
Figure 2:
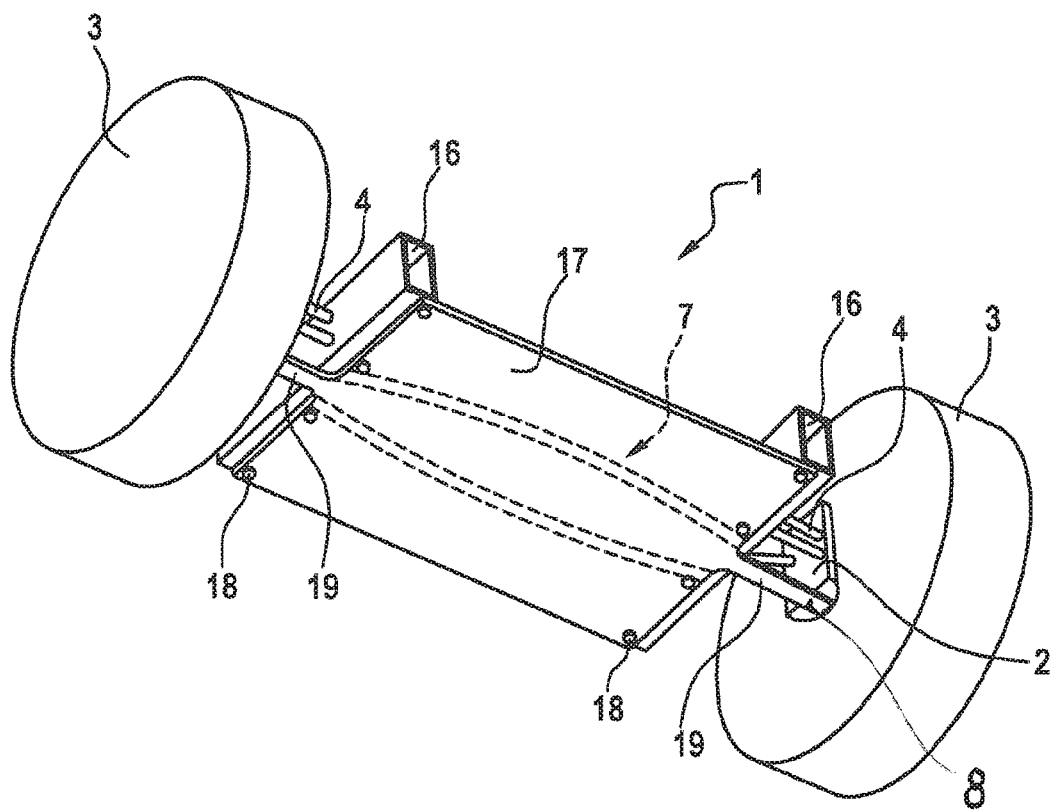
FIG. 2 illustrates an axle arrangement according to the invention for a vehicle according to the first exemplary embodiment in a second spatial representation.

FIG. 1 shows in a spatial view obliquely from above and FIG. 2 shows in a spatial view obliquely from below an axle arrangement 1 of a double track vehicle according to a first exemplary embodiment. The axle arrangement 1 includes—as is principally typical—a left side and a right side (and therefore two) wheel carriers 2, with a wheel 3 attached to each of them. The axle arrangement 1 is used either as front axle or as rear axle of a motor vehicle. The wheel carriers 2 are pivotably connected to the vehicle body 16 (shown here by longitudinal body side members) via a plurality of links 4.

The axle arrangement 1 furthermore includes a so-called shear field 17, which is connected to the bodywork 16 via multiple bodywork connecting points 18. It is known that a shear field (17) is an essentially plate-shaped stiffening element which, if applicable, may be multi-layered and is provided, in particular, in the area of the vehicle axles, in particular with passenger cars. The shear field 17 essentially extends in a horizontal plane as viewed in the transverse direction of the vehicle between the lateral edges of the vehicle body and projects, viewed in the longitudinal direction of the vehicle (which runs parallel to the plane of the shear field 17 perpendicular to a connecting line of the mid-points of the two wheels 3) generally past the actual vehicle axle, which is defined by the wheel-guided links 4. In the present case, the shear field is made of fiber reinforced plastic.

Furthermore, the axle arrangement 1 includes a transverse leaf spring 7 which extends in the transverse direction of the vehicle. The ends 8 of the transverse leaf spring are connected in the first exemplary embodiment in form of extensions 19 to the wheel carriers 2 in a wheel-guided fashion. The transverse leaf spring 7 is made in one piece of fiber reinforced plastic and separates in the present case into two bands or belts 9 in the area between the ends. The two bands 9 join towards the ends 8 of the transverse leaf spring 7.

The transverse leaf spring 7 is at least partially integrated in the shear field. To that end, in the first exemplary embodiment, the transverse leaf spring 7, which has two (or, which is not shown, multiple) bands 9, is laminated onto the shear field 17 or its upper side. Therefore, the bands 9 are represented visibly in FIG. 1 and non-visibly by dashes in FIG. 2. However, the transverse leaf spring 7 together with its extensions 19 and the shear field 17 can also be made in one piece of fiber reinforced plastic. As shown in FIGS. 1 and 2, the aforementioned extensions 19 and/or their end sections 8 of the transverse leaf spring 7 are connected in a wheel-guided (and therefore rigid) fashion to the respective associated wheel carrier 2.

Figure 3:
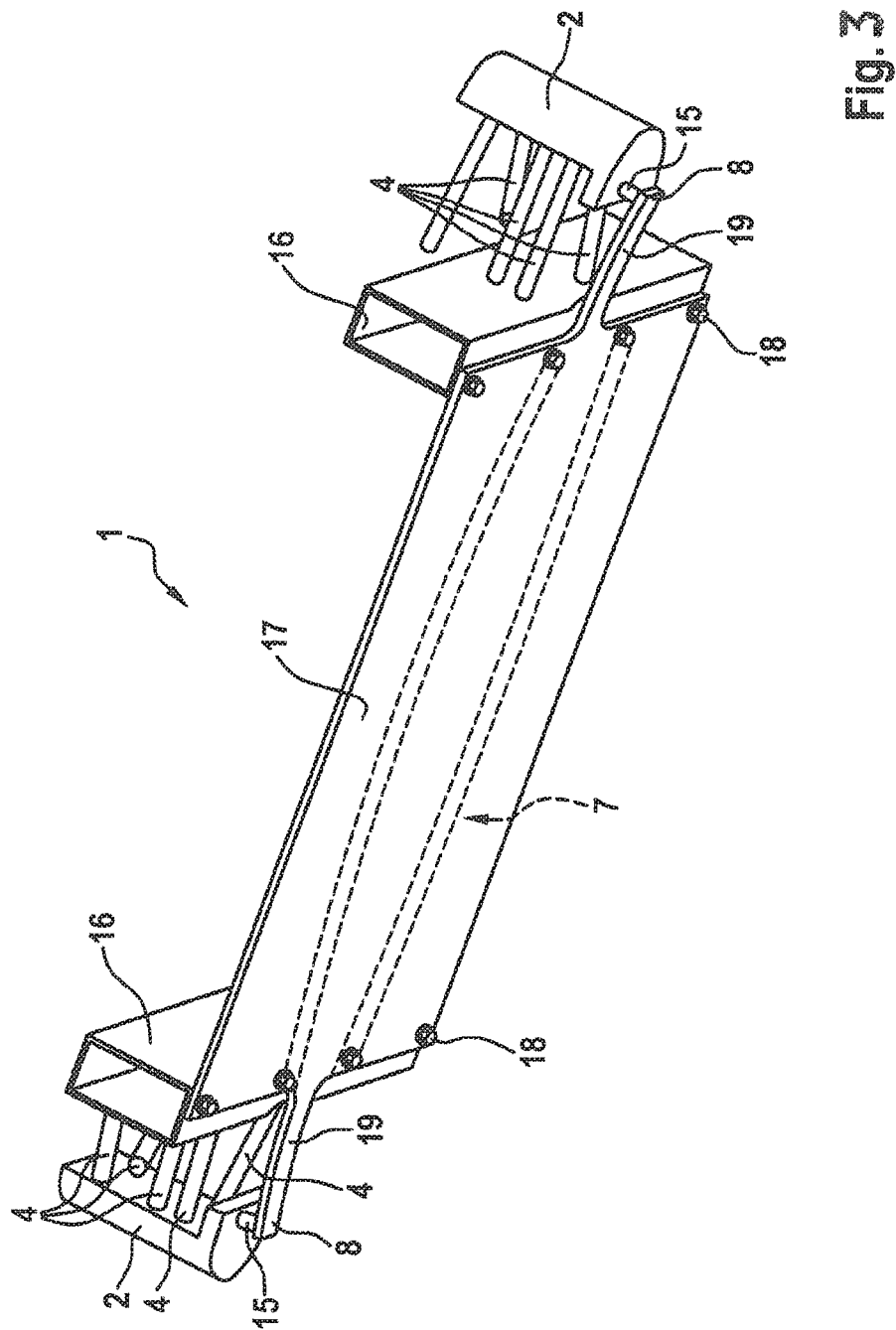
FIG. 3 is a modification of the first exemplary embodiment, with the wheels not shown here.

FIG. 3 shows a modification of the first exemplary embodiment in a view obliquely from below, according to which the extensions 19 of the transverse leaf spring 7 are connected to the wheel carriers 2 in a non-wheel guided fashion. Rather, the ends 8 of the extensions 19 are connected to the wheel carriers 2 via connecting elements 15 that act the same way and/or as pendulum supports. Five links 4 are provided for the wheel guidance here, which are pivotably connected to the vehicle body 16.

Figure 4:
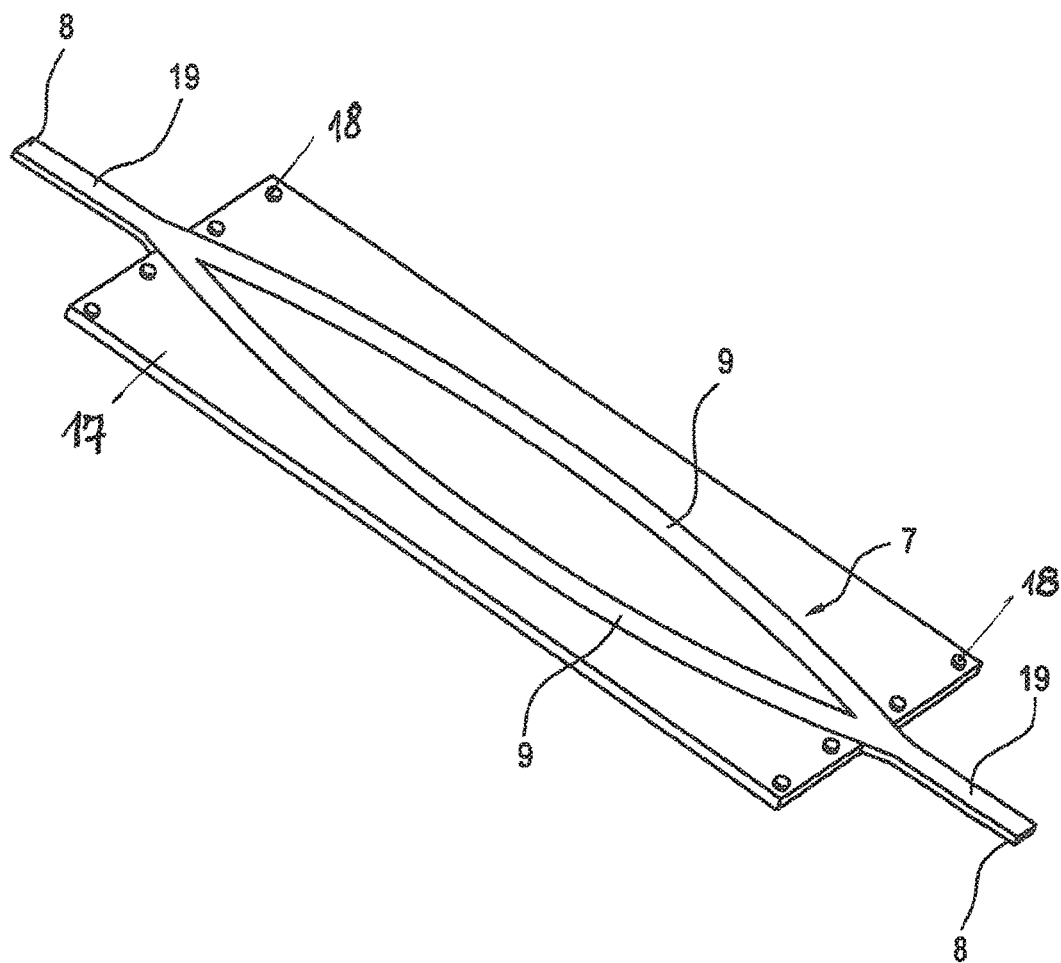
FIG. 4 illustrates only a shear field with a transverse leaf spring provided thereon.

FIG. 4 shows only a shear field 17 with a transverse leaf spring 7 which has two bands 9 and is integrated, for example in the form of a material thickness, in a perpendicular direction to the plane of the shear field 17.

Figure 5:
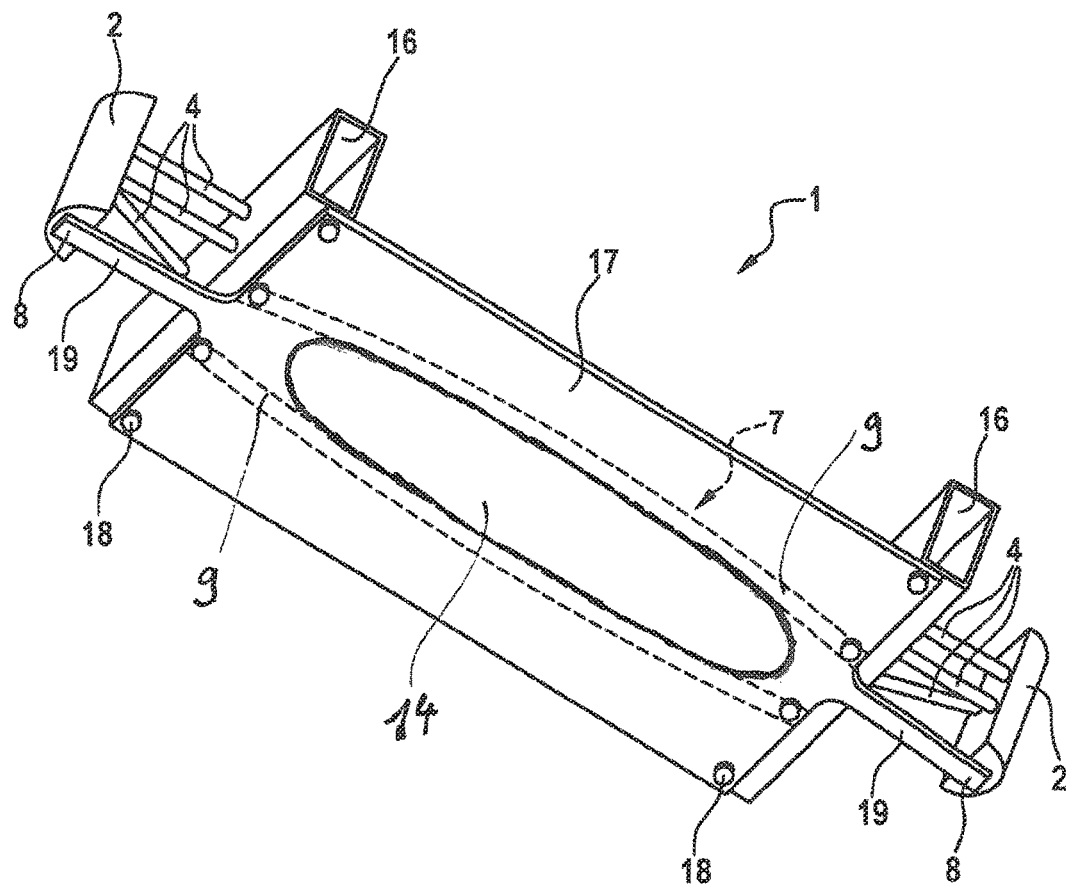
FIG. 5 is another modification of the first exemplary embodiment in a representation similar to FIG. 3

In the exemplary embodiment according to FIG. 5, in a spatial view obliquely from below, a free space 14 is provided between the two bands 9 of the transverse leaf spring 7, which—because analogously to FIG. 4 they are on the upper side of the shear field 17—are shown only in dashed lines. The free space 14 is developed as an opening in the shear field 17, e.g. the free space 14 practically represents a hole in the shear field 14, the edge of which is formed over a wide area by the peripheral sections of the bands 9.

Figure 6:
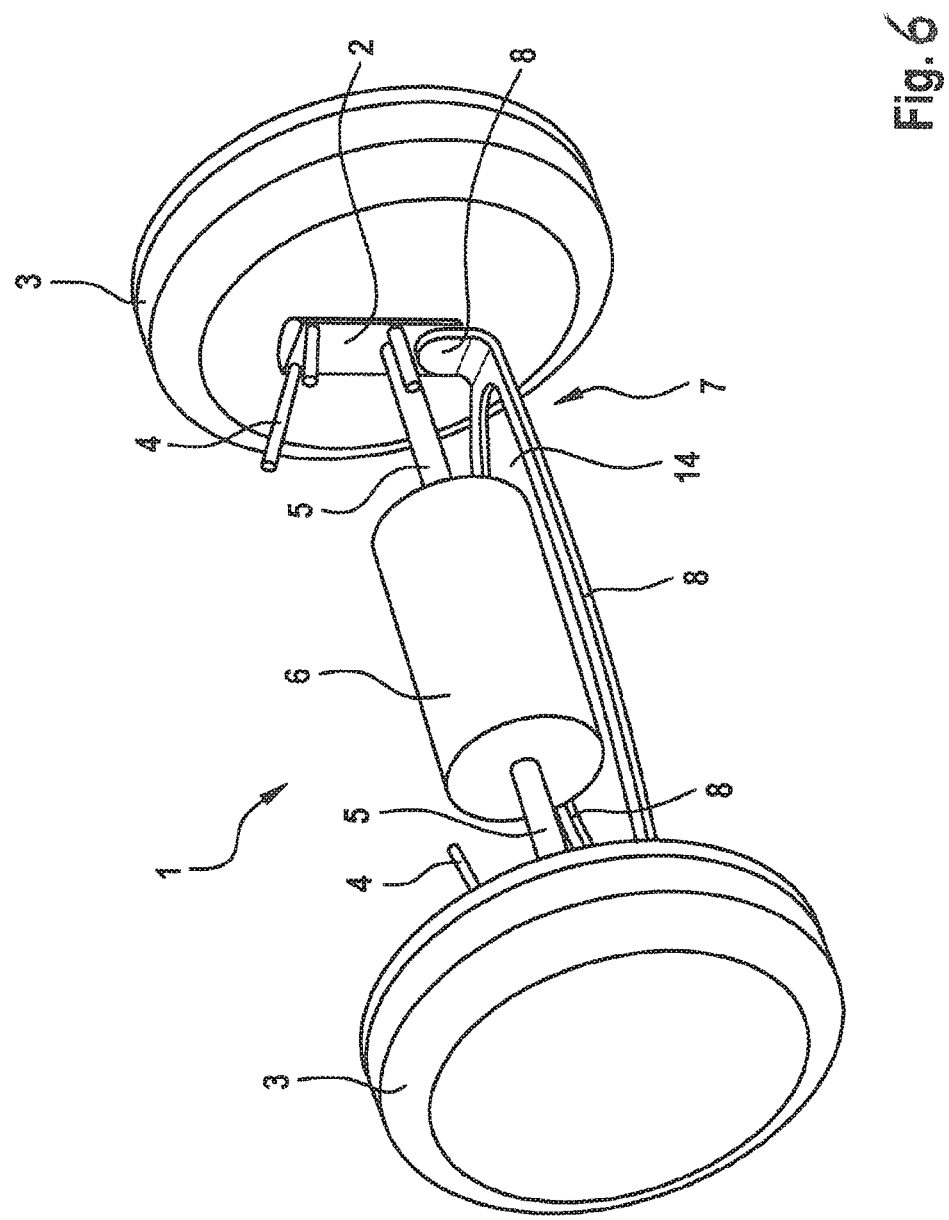
FIG. 6 illustrates another motor vehicle axle arrangement according to an embodiment of the invention with a machine that partially extends into a so-called free space of the transverse leaf spring, with the shear field not being shown for the sake of clarity.

FIG. 6 (spatial view obliquely from above) and FIG. 7 (spatial view obliquely from below), which do not show the shear field 17, show that according to a further exemplary embodiment, an electrical machine 6 can be provided between the two wheel carriers 2. The electrical machine 6 is used for propulsion of the vehicle. The electrical machine 6 has an armature shaft 5 on both sides of the electrical machine 6 which leads to the wheels 3. The armature shaft 5 of the electrical machine 6 is arranged approximately at the height of the hubs of the wheels 3. As is shown, the electrical machine 6 extends at least partially into the aforementioned free space 14, which is provided between the two bands 9 of the transverse leaf spring in the shear field (not shown).

To obtain a sufficiently large free space 14, the following dimensions are preferably provided. According to FIG. 8, which is a detailed representation of FIG. 6, the free space 14 has, measured in the transverse direction of the vehicle, a first width 10. The entire transverse leaf spring 7 has a second width 11. The first width 10 is at least 60% of the second width 11. This allows for a sufficiently large free space 14 in the transverse direction of the vehicle.

According to FIG. 7, the free space 14 extends in the longitudinal direction of the vehicle over a first length 12. At the largest point, the entire transverse leaf spring 7 has in the longitudinal direction of the vehicle a second length 13. Said first length 12 is at least 40% of the second length 13 so that the free space 14 is also sufficiently large in the longitudinal direction of the vehicle to accommodate the electrical machine 6. FIG. 8 furthermore shows, with dashed lines and extremely abstracted, the shear field 17 onto which the transverse leaf spring 7 is laminated. It goes without saying that the free space 14 extends through the shear field 17 and/or is also provided in the shear field.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An axle arrangement for a motor vehicle, comprising:
   two opposite wheel carriers which are connectable to a body work of the motor vehicle via links;
   a transverse leaf spring connected to the two wheel carriers, the transverse leaf spring being made in one-piece of fiber-reinforced plastic and having at least two bands that are spaced apart from one another; and
   a shear field configured to extend between the two wheel carriers, the shear field being fixedly connectable on both sides to the bodywork of the motor vehicle, wherein
   the transverse leaf spring is at least partially integrated into the shear field over at least a majority of a transverse length of the leaf spring, and
   the shear field, when viewed in a longitudinal direction of the vehicle, extends beyond the transverse leaf spring.

2. The axle arrangement according to claim 1, wherein the shear field is made of fiber reinforced plastic and the transverse leaf spring is configured as a material thickening in the shear field.

3. The axle arrangement according to claim 1, wherein the transverse leaf spring is laminated onto the shear field.

4. The axle arrangement according to claim 1, wherein the transverse leaf spring extends laterally over the shear field and has extensions that are connected to the wheel carriers.

5. The axle arrangement according to claim 1, wherein
   a free space is located between the two bands of the transverse leaf spring,
   a width of the free space in a transverse direction of the vehicle being at least 60% of a width of the transverse leaf spring in the transverse direction of the vehicle, and
   a length of the free space in a longitudinal direction of the vehicle being at least 40% of a longest length of the transverse leaf spring in the longitudinal direction of the vehicle.

6. The axle arrangement according to claim 5, further comprising an electrical machine configured to extend into the free space between the two bands of the transverse leaf spring.

* * * * *